US012809121B2

(12) United States Patent
Yuan et al.

(10) Patent No.: US 12,809,121 B2
(45) Date of Patent: Nov. 24, 2026

(54) OPTICAL ZOOM CAMERA MODULE COMPRISING A PLURALITY OF CARRIERS EACH HAVING A LENS ASSEMBLY AND CORRESPONDING PORTABLE TERMINAL DEVICE

(71) Applicant: NINGBO SUNNY OPOTECH CO., LTD., Ningbo City (CN)

(72) Inventors: Dongli Yuan, Ningbo City (CN); Qi Wang, Ningbo City (CN); Zhihan Wu, Ningbo City (CN); Haitao Wang, Ningbo City (CN); Zhou Zhou, Ningbo City (CN); Yanning He, Ningbo City (CN); Shuwei Liao, Ningbo City (CN); Wenke Yu, Ningbo City (CN); Chen Qiu, Ningbo City (CN)

(73) Assignee: NINGBO SUNNY OPOTECH CO., LTD., Ningbo City (CN)

( * ) Notice: Subject to any disclaimer, the term of this patent is extended or adjusted under 35 U.S.C. 154(b) by 622 days.

(21) Appl. No.: 18/267,457

(22) PCT Filed: Dec. 6, 2021

(86) PCT No.: PCT/CN2021/135625
§ 371 (c)(1),
(2) Date: Dec. 13, 2023

(87) PCT Pub. No.: WO2022/127630
PCT Pub. Date: Jun. 23, 2022

(65) Prior Publication Data

US 2025/0271633 A1 Aug. 28, 2025

(30) Foreign Application Priority Data

Dec. 18, 2020 (CN) ........................ 202011503273.X
Dec. 18, 2020 (CN) ........................ 202011508955.X

(51) Int. Cl.
*G02B 7/10* (2021.01)

(52) U.S. Cl.
CPC .................................... *G02B 7/102* (2013.01)

(58) Field of Classification Search
CPC ........................................................ G03B 5/04
See application file for complete search history.

(56) References Cited

U.S. PATENT DOCUMENTS 4,534,624 A 8/1985 Toda et al.
2004/0156181 A1 8/2004 Nomura et al.
(Continued)

FOREIGN PATENT DOCUMENTS

CN 101246243 A 8/2008
CN 201322820 Y 10/2009
(Continued)

*Primary Examiner* — Paul C Lee
(74) *Attorney, Agent, or Firm* — Che-Yang Chen

(57) ABSTRACT

An optical zoom module (1000) comprising: a module housing (100); a plurality of lens assemblies (10, 20, 30), which are arranged coaxially along an axis; a straight guiding rod (200), which is parallel to the axis and disposed on a first side (A) of the module housing (100); a plurality of carriers, wherein one lens assembly (10, 20, 30) is mounted in each carrier, at least two of the plurality of carriers are movable carriers (40, 50), and the straight guiding rod (200) passes through the at least two movable carriers (40, 50), such that the at least two movable carriers (40, 50) can move along the straight guide rod (200), respectively; and a second rail located on a second side (B) of the module housing (100), the second side (B) is opposite to the first side (A), the second rail is parallel to the straight guiding rod (200), and an upper surface of the second rail and the lower surface of the movable carriers (40, 50) are supported by the balls (112), wherein further provided is a corresponding portable terminal device, wherein the optical zoom module (1000) implements continuous optical zoom- (Continued)

1000 ing at a relatively small space cost, and the zoom movement of a movable lens has excellent collimation.

20 Claims, 6 Drawing Sheets

(56) References Cited

U.S. PATENT DOCUMENTS

| | | | | |
|---|---|---|---|---|
| 2012/0120507 | A1 | 5/2012 | Gutierrez et al. | |
| 2015/0256727 | A1 | 9/2015 | Kim et al. | |
| 2020/0348479 | A1 | 11/2020 | Kwon et al. | |
| 2023/0341745 | A1* | 10/2023 | Kim | G03B 17/12 |

FOREIGN PATENT DOCUMENTS

| | | | |
|---|---|---|---|
| CN | 102213813 | A | 10/2011 |
| CN | 203133365 | U | 8/2013 |
| CN | 103364918 | A | 10/2013 |
| CN | 103969915 | A | 8/2014 |
| CN | 104459930 | A | 3/2015 |
| CN | 205301682 | U | 6/2016 |
| CN | 107135344 | A | 9/2017 |
| CN | 207895140 | U | 9/2018 |
| CN | 109884768 | A | 6/2019 |
| CN | 110058379 | A | 7/2019 |
| CN | 110581935 | A | 12/2019 |
| CN | 111025515 | A | 4/2020 |
| CN | 111103699 | A | 5/2020 |
| CN | 111684353 | A | 9/2020 |
| CN | 113740992 | A | 12/2021 |
| EP | 4152070 | A1 | 3/2023 |
| JP | 10232428 | A | 9/1998 |
| JP | 2005055664 | A | 3/2005 |
| JP | 2005274977 | A | 10/2005 |
| JP | 2017161677 | A | 9/2017 |
| KR | 20180098463 | A | 9/2018 |
| KR | 20200012421 | A | 2/2020 |
| WO | 2020174325 | A2 | 9/2020 |

* cited by examiner

OPTICAL ZOOM CAMERA MODULE COMPRISING A PLURALITY OF CARRIERS EACH HAVING A LENS ASSEMBLY AND CORRESPONDING PORTABLE TERMINAL DEVICE

CROSS REFERENCE OF RELATED APPLICATION

This is a U.S. National Stage under 35 U.S.C. 371 of the International Application Number PCT/CN2021/135625, filed on Dec. 6, 2021, which claims priority to Chinese patent application entitled "Optical Zoom Camera Module", filed Dec. 18, 2020, Chinese application number 202011508955.X, and Chinese patent application entitled "Optical Zoom Camera Module and Corresponding Portable Terminal Device", filed Dec. 18, 2020, Chinese application number 202011503273.X, the entire contents of each of which are expressly incorporated herein by reference.

FIELD OF INVENTION

The present invention relates to the technical field of camera module, particularly to an optical zoom camera module.

DESCRIPTION OF RELATED ARTS

With the improvement of living standards, consumers have higher and higher requirements for the camera functions for smart phones, tablets and other terminal devices, not only for background bokeh, night shoot and other effects, but also for telephoto requirements. Consumers demand a terminal device which is able to clearly capture distant images. Optical zoom modules are camera modules that realize zoom shooting. Optical zoom achieves the purpose of zooming by adjusting the distance between the optical lenses to changing the focal length of the lens to achieve the purpose of optical zoom, which is able to capture distant objects clearly, and has a relatively high image capturing quality. Zooming refers to changing the focal length in order to capture the scene at different distances herein. Furthermore, periscopic modules are used in existing terminal devices, such as smart phones, to meet the telephoto requirements, however, how to make the periscopic modules have optical zoom capability in the limited space of the smart phone is a major challenge currently faced.

Optical zoom camera modules generally comprise at least two slidable lens carriers, so that the zoom lens assembly and the compensation lens assembly can move respectively. Wherein, the zoom lens assembly moves along the optical axis, which can adjust the focal length of the entire imaging system. The compensation lens assembly also moves along the optical axis to realize the focusing function of the camera module, and to compensate the focus shift caused by the movement of the zoom lens group assembly, thereby improving the imaging quality of the camera module. In order to realize the above movement, one idea in the prior art is to install guide grooves on the module housing, and assemble two (or more) lens carriers on the guide grooves through balls and corresponding bearings, so that the zoom lens assembly and the compensation lens assembly can move along the optical axis and along the guide grooves. However, for the optical zoom module, especially for the optical zoom module having a long focal length, the moving stroke of the lens carrier is relatively longer, and the machining precision (especially machining precision for mass-produced products) of the guide grooves made in the module housing (or other similar fixed parts) is limited, and the manufacturing tolerance of the guide groove itself may lead to insufficient collimation degree of the moving strokes of two (or more) lens carriers, thereby resulting in a decrease in the imaging quality of the module.

To solve the above problems, a solution based on the guidance of double guide rods is proposed by the prior art to realize the collimation degree of sliding of multiple lens carriers. In the solution, two parallel guide rods are usually installed on both sides of the optical zoom module, the two lens carriers are mounted on the two guide rods on both sides, and each straight guiding rod passes through the two lens carriers. In this way, both lens carriers can slide along the guide rod during zooming. More specifically, multiple carriers assembled with lens structures are arranged in sequence from the object side to the image side, and during the process of shooting, the multiple carriers are driven to move, so as to realize continuous zooming during the shooting process and improve the imaging quality of the module effectively. It should be noted that, in the solution, sometimes, more guide rods are installed, and the above is an example of installing one guide rod on each of two sides. For example, patent application CN201980011002. 1 discloses a camera module, which comprises: a base; a plurality of guide rods coupled to the base; a first mover installed in the base, comprising at least one lens mounted therein; and a second mover installed in the base, comprising at least one lens mounted therein, wherein, each of the first mover and the second mover has a plurality of guide grooves formed therein to allow the guide rods to be mounted in the guide grooves, wherein each of the guide grooves has a protruding portion, which is formed to contact with a corresponding one of the guide rods. Wherein, the first mover may correspond to one of the lens carriers (sub-lenses or lens assembly can be installed in the lens carriers directly), and the second mover correspond to the another lens carrier.

Since the guide rods can be made of metal materials or other rigid materials that are not easy to bend, it has a better collimation degree than the linear guide grooves in the housing (usually made of plastic). However, in such technical solutions, the metal guide rods need to be installed at each side of the module respectively, and the guide rods generally need to pass through at least two lens carriers, which results in that the lens carriers also need to have a certain thickness to ensure their structural strength, resulting in the module occupying a larger volume on both sides of the module, which is disadvantageous to the miniaturization of the device.

Therefore, there is an urgent need for a solution that can both reduce the volume of the optical zoom module and ensure that the moving path of the sliding parts thereof has a high collimation degree.

Furthermore, when applying above the optical zoom module based on the guide rods to a consumer electronic terminals (such as, smart phones), in addition to improving the collimation degree of the zoom movement and enhancing image quality, other aspects of the user experience also need to be considered. The inventor of the present invention have found that compared with the suspension system based on springs or spring sheets, the friction force (or resistance) of the guide rods at the moving direction of the movable carrier (referring to the movable carrier carrying the zoom lens assembly or the compensation lens assembly) can be significantly reduced. On the one hand, this will facilitate to reduce the driving force requirement of the movable carrier, helping to achieve a larger zoom moving stroke and improve the zoom response speed with a smaller volume of the driving element. However, on the other hand, the significant reduction of friction force may lead to some problems that affect the user experience. For example, since the great reduction of resistance of the movable carrier in the direction of the guide rod, sometimes, the smart phone is shaken (such as, the "shake" function is utilized in some applications which may require the user to actively shake the smart phone), bumped or under special use conditions, which may cause the movable carrier to slide along the guide rod and result in a collision, the collision may results in an unpleasant noise, and this collision may also inspire the user to have an illusion that there are loose components inside the smart phone, thus severely affecting the user experience. In particular, for a long-focus periscopic optical zoom module having a long-stroke, which is generally installed in high-end smart phones, consumers have relatively higher requirements for all aspects of the smart phones, and consumers may be more sensitive to abnormal noises and vibrations emitted by the smart phones, which results in a serious negative impact on the commercial value of the optical zoom modules based on the guide rod. Finally, since the movable carrier is easy to slide and cause a collision, the collision may result in debris, so as to lead to a stain on the images captured by the module, which impacts the production yield and long-term reliability of the module.

In summary, the current market is still looking forward to a solution that can take into account both the user experience and ensure a high collimation degree of the moving path of its sliding parts.

SUMMARY OF THE PRESENT INVENTION

An advantage of the present invention is to provide a solution that can both reduce the volume of the optical zoom module and ensure a high collimation degree of the moving path of its sliding parts, so as to overcome the shortcomings of the prior art.

Another advantage of the present invention is to provide a solution that can both take into account the user experience and ensure a high collimation degree of the moving path of its sliding parts, so as to overcome the shortcomings of the prior art.

In order to solve the above technical problems, the present invention provides an optical zoom module comprising:

a module housing;

a plurality of lens assemblies arranged coaxially along an axis;

at least one straight guiding rod, which is parallel to the axis and is arranged at a first side of the module housing;

a plurality of carriers, wherein each carrier has a lens assembly mounted therein, and at least two carriers of the plurality of carriers are movable carriers, and the straight guiding rod passes through the at least two movable carriers to enable the at least two movable carriers to move along the straight guiding rod respectively; and a first rail located on a second side of the module housing, wherein the second side is opposite to the first side, wherein the first rail is parallel to the straight guiding rod, and at least one first ball is supported between an upper surface of the first rail and a lower surface of each of the at least two movable carriers.

Wherein, the first rail has a flat upper surface.

Wherein, the first rail is a strip-shaped metal sheet, and the first balls are supported between the upper surface of the metal sheet and the lower surface of the movable carrier.

Wherein, the first rail is directly formed at the upper surface of the housing bottom plate.

Wherein, at the second side of the module housing, the lower surface of the movable carrier is provided with a groove having a down-facing opening, the first balls are received in the groove and clamped between the groove and the first rail.

Wherein, at the first side of the module housing, each of the movable carriers has a straight guiding rod matching through hole, and the straight guiding rod passes through the straight guiding rod matching through hole of each movable carrier in sequence.

Wherein, at least one annular accommodating cavity is formed between an inner side surface of the straight guiding rod matching through hole and the straight guiding rod, and a plurality of second balls are provided in the annular accommodating cavity, and the second balls are provided to surround the straight guiding rod.

Wherein, the optical zoom module is a periscopic optical zoom module.

Wherein, the optical zoom module further comprises a light reflecting element, the light reflecting element is used to reflect an incident light from an incident path to an imaging path, wherein an optical center of the incident path defines an incident light axis, an optical center of the imaging path defines a main optical axis, and the incident light axis is perpendicular with the main optical axis.

Wherein, the plurality of carriers comprises a fixed carrier and two movable carriers, a fixed lens assembly is installed in the fixed carrier, and a zoom lens assembly and a compensation lens assembly are respectively installed in the two movable carriers; the zoom lens assembly is arranged for adjusting the focal length of the entire imaging system, and the compensation lens assembly realizes the focus of the imaging system to compensate the focus shift caused by the movement of the zoom lens assembly.

Wherein, the fixed lens assembly, the zoom lens assembly and the compensation lens assembly are arranged from the object side to the image side in sequence.

Wherein, the optical zoom module further comprises a photosensitive assembly, wherein the photosensitive assembly comprises a first circuit board and a photosensitive chip provided on a surface of the first circuit board, the side of the first circuit board has a flexible connecting belt, wherein the flexible connecting belt is bent to the first side or the second side of the module housing, the first side or the second side of the module housing has a second circuit board, which is electrically communicated with the first circuit board through the flexible connecting belt.

Wherein, the straight guiding rod is fixed to the module housing; the module housing comprises a housing bottom plate, a housing sidewall and a cover.

Wherein, the first rail is a guiding groove defined in the housing bottom plate, the first ball is arranged in the guiding groove and adapted for rolling along the guiding groove, and the guidance direction of the guiding groove is parallel to the straight guiding rod, and the top surface of the first ball supports the lower surface of the movable carrier.

Wherein, the movable carrier comprises a first sliding mounting member located at the first side, a first sliding portion located at the second side, and a carrier bottom plate, which is provided to connect the first sliding mounting member and the first sliding portion, wherein the first sliding mounting member, the first sliding portion and the carrier bottom plate define a U-shaped groove, and the lens assembly is installed in the U-shaped groove.

Wherein, the lens assembly is assembled through a lens barrel, and an outer side surface of the lens barrel is fixed on an inner side surface of the U-shaped groove.

Wherein, there is a gap between the carrier bottom plate and the housing bottom plate.

Wherein, at the first side, the housing sidewall has a limiting structure, wherein the limiting structure is provided between the first sliding mounting members of the two adjacent movable carriers, and the straight guiding rod passes through at least two of the first sliding mounting members of the two movable carriers and the limiting structure.

Wherein, a buffer layer is provided on an end surface of the first sliding mounting member and/or an end surface of the limiting structure.

Wherein, at the first side, the housing sidewall has a limiting structure, wherein the limiting structure is provided between the first sliding mounting members of the two adjacent movable carriers, and the straight guiding rod passes through at least two of the first sliding mounting members of the two movable carriers and the limiting structure, a buffer layer is provided on an end surface of each of the lens barrels provided in the U-shaped grooves of the two adjacent movable carriers.

Wherein, the movable carrier is driven by a first magnet and a coil.

Wherein, the first magnet is disposed on an inner side surface of the housing sidewall, and the coil is disposed on an outer side surface of the movable carrier.

Wherein, the movable carrier comprises a first sliding mounting member, a first sliding portion, and a carrier bottom plate, which is provided to connect the first sliding mounting member with the first sliding portion, wherein the first sliding mounting member is located at the first side of the module housing, the first sliding portion is located at the second side of the module housing; the first sliding mounting member, the first sliding portion and the carrier bottom plate define a U-shaped groove, the lens assembly is installed in the U-shaped groove; the first magnet is disposed on the inner side surface of the housing sidewall of the first side, and the coil is disposed on the outer side surface of the first sliding mounting member of the movable carrier.

Wherein, the bottom surface of each of the first sliding portions has a groove, the first balls are installed in the grooves, and the bottom surface of the first sliding portion and the upper surface of the first rail are supported by the first balls.

Wherein, the first rail contains magnetic conductive materials; at the first sliding portion, a second magnet is installed above the groove, and the magnetic force between the second magnet and the first rail enables the first balls to be clamped between the groove and the first ail.

According to another aspect of the present invention, an optical zoom module is provided, which comprising: a plurality of sub-lenses arranged coaxially along an axis, each sub-lens comprises a lens assembly and a lens barrel for supporting and assembling the lens assembly; one or more straight guiding rods parallel to the axis; a plurality of carriers, each of the carriers is installed with one of the sub-lens, and at least two carriers of the plurality of carriers are movable carriers, each of the straight guiding rods passes through at least two of the movable carriers, so that at least two of the movable carriers can move along the straight guiding rods respectively; a plurality of limiting structure, a relative position between the limiting structure and the straight guiding rod is fixed, and the limiting structures are arranged at two ends of the moving path of the movable carrier to limit the moving stroke of the movable carrier; and a buffer layer, which is arranged on an end surface of the limiting structure, wherein the end surface faces the movable carrier, or is arranged on another end surface of the movable carrier, wherein the another end surface faces the limiting structure, or is arranged on an end surface of the lens barrel.

Wherein, the optical zoom module further comprises a module housing, and the straight guiding rods are arranged on two sides of the module housing.

Wherein, the buffer layer is an elastic material layer.

Wherein, the buffer layer is a buffering structure comprising a spring and a baffle.

Wherein, the buffer layer comprises a spring, and two ends of the spring is respectively connected to two end surfaces of the limiting structure and the movable carrier, which are opposite to each other.

Wherein, the optical zoom module further comprises a light reflecting element, the light reflecting element is used to reflect an incident light from an incident path to an imaging path, wherein an optical center of the incident path defines an incident light axis, an optical center of the imaging path defines a main optical axis, and the incident light axis is perpendicular with the main optical axis.

Wherein, the plurality of carriers comprises a fixed carrier and two movable carriers, a fixed lens assembly is installed in the fixed carrier, and a zoom sub-lens and a compensation sub-lens are respectively installed in the two movable carriers; the zoom sub-lens is arranged for adjusting the focal length of the entire imaging system, and the compensation sub-lens realizes focusing of the imaging system to compensate the focus shift caused by the movement of the zoom sub-lens.

Wherein, the straight guiding rod is fixed to the module housing; the module housing comprises a housing bottom plate, a housing sidewall and a cover.

Wherein, the movable carrier comprises a first sliding mounting member located at the first side, a first sliding portion located at the second side, and a carrier bottom plate, which is provided to connect the first sliding mounting member and the first sliding portion, wherein the first sliding mounting member, the first sliding portion and the carrier bottom plate define a U-shaped groove, and the sub-lens is installed in the U-shaped groove.

Wherein, an outer side surface of the sub-lens is fixed on an inner side surface of the U-shaped groove.

Wherein, the housing sidewall has a limiting structure, wherein the limiting structure is provided between the first sliding mounting members of the two adjacent movable carriers, and the straight guiding rod passes through at least two of the first sliding mounting members of the two movable carriers and the limiting structure.

Wherein, the limiting structure is integrally with the housing sidewall, and the limiting structure supports the straight guiding rod.

Wherein, the elastic material layer is made of silicone gel material.

Wherein, the elastic material layer is an ethyl urethane film.

Wherein, the elastic material layer based on an injection molding or molding process is integrated with the movable carrier, the limiting structure or the lens barrel, so that the elastic material layer is directly formed on the movable carrier, the limiting structure or the end surface of the lens barrel.

According to another aspect of the present invention, a portable terminal device is provided, which comprises the optical zoom module described in any one of the above solutions.

Compared with the prior art, the present invention has at least one of the following technical effects:

1. The optical zoom module of the present invention can realize continuous optical zoom with a smaller space cost, and its sliding components can slide along the straight guiding rod, so it has excellent collimation degree.

2. The optical zoom module of the present application has a straight guiding rod, which can effectively ensure that the moving directions of the zoom lens assembly and the compensation lens assembly do not deviate from the main optical axis, and is especially suitable for a continuous optical zoom module having a long focal length.

3. In some embodiments of the present invention, the risk of stains on images captured by the lens can be reduced by setting anti-collision materials on the sliding components of the optical zoom module, so as to avoid debris generated by collisions.

4. In some embodiments of the present invention, the optical zoom module is compact in structure and easy to assemble, which is very beneficial for mass production.

5. The solution of the optical zoom module of the present invention is particularly suitable for the long-focus zoom module having a periscopic structure, in other words, when the moving stroke of sliding components is too long, the advantages of the present invention will be more obvious compared to the optical zoom solution without straight guiding rods.

6. In some embodiments of the present invention, for a mobile phone equipped with the zoom module based on a straight guiding rod, a buffer layer or a buffering structure can be provided to prevent the movable carrier from colliding and emitting sound and vibration, so as to prevent consumers from misunderstandings about the quality of the phone and improve the user experience.

DETAILED DESCRIPTION OF THE EMBODIMENTS

Figure 1:
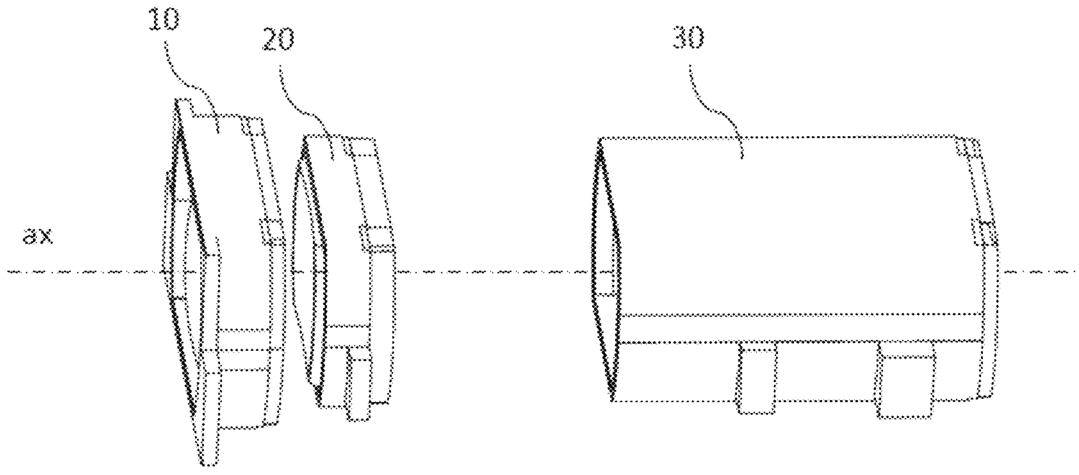
FIG. 1 is a schematic diagram illustrating the positional relationship of three sub-lenses of an embodiment of the present invention.

In order to better understand the present invention, various aspects of the present invention will be described in more detail with reference to the accompanying drawings. It should be understood that these detailed descriptions are only for the description of the exemplary embodiments of the present invention and are not intended to limit the scope of the present invention in any way. Throughout the specification, the same reference numerals refer to the same elements. The term "and/or" includes any and all combinations of one or more of the associated listed items.

It should be noted that in this specification, the descriptions of first, second, and so on are only used to distinguish one feature from another feature and do not imply any limitation on the features. Therefore, the first body discussed below could also be referred to as a second body without departing from the spirit of the present invention.

In the drawings, the thickness, size and shape of the objects have been slightly exaggerated for the sake of illustration. The drawings are examples only and are not drawn strictly to scale.

It should also be understood that the terms "including", "comprising", "having", "containing", and/or "containing therein", when used in the present specification, denote the presence of stated the features, integers, steps, operations, elements and/or parts, but do not exclude the presence or addition of one or more other features, integers, steps, operations, elements, parts and/or combinations thereof. Furthermore, when an expression such as " . . . at least one of" appears after a list of listed features, the entire list of listed features is alternative rather than the individual components of the list. Furthermore, when describing embodiments of the present invention, the term "may" means "one or more embodiments of the present invention." Also, the term "exemplary" is intended to refer to examples or illustrations.

As used herein, the terms "substantially", "approximately", and similar terms are used as terms of approximation, not as degree of terms, and are intended to account for inherent biases in measured or calculated values or recognized by those skilled in the art.

Unless otherwise defined, all terms used herein (including technical and scientific terms) have the same meaning as commonly understood by those skilled in the art to which this application belongs. It should also be understood that terms (such as those defined in commonly used dictionaries) should be interpreted to have meanings consistent with their meanings in the context of the related technology, and will not be interpreted in an idealized or overly formal sense, unless it is expressly so limited herein.

It should be noted that the embodiments and the features in the embodiments in the present invention may be combined with each other in the case of no conflict.

The present invention will be further described below, in connection with the accompanying drawings and specific embodiments.

Figure 2:
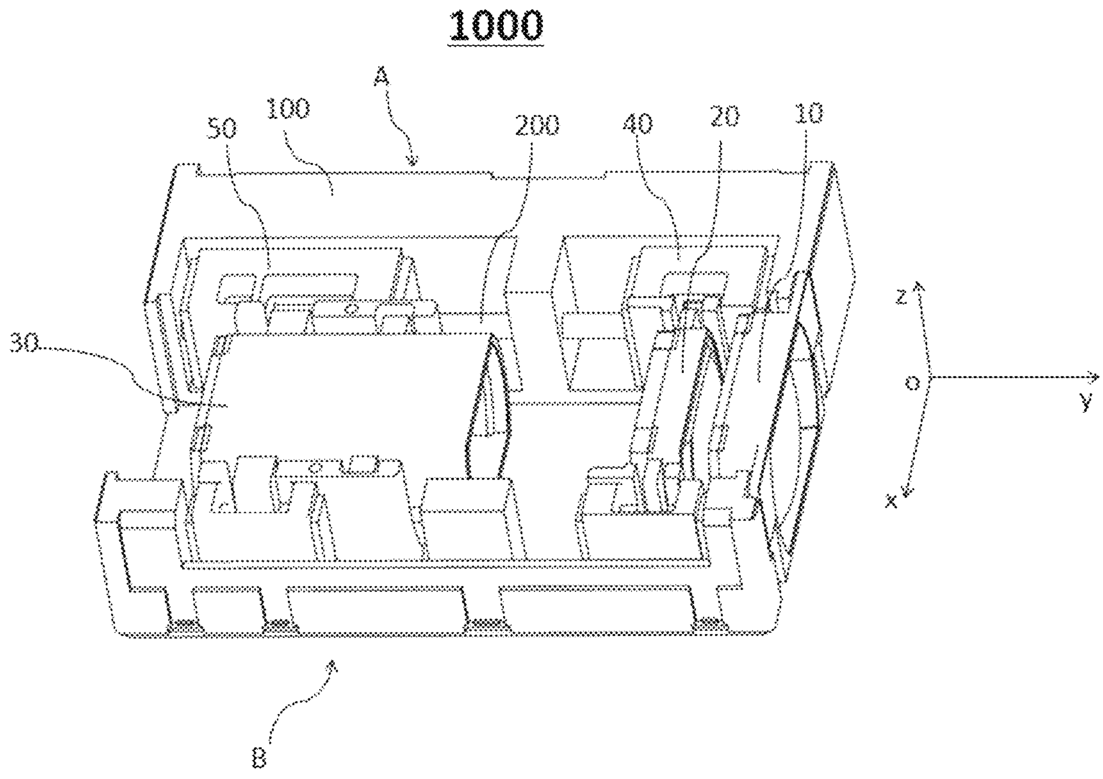
FIG. 2 is a perspective view illustrating an optical zoom module of an embodiment of the present invention.
Figure 3:
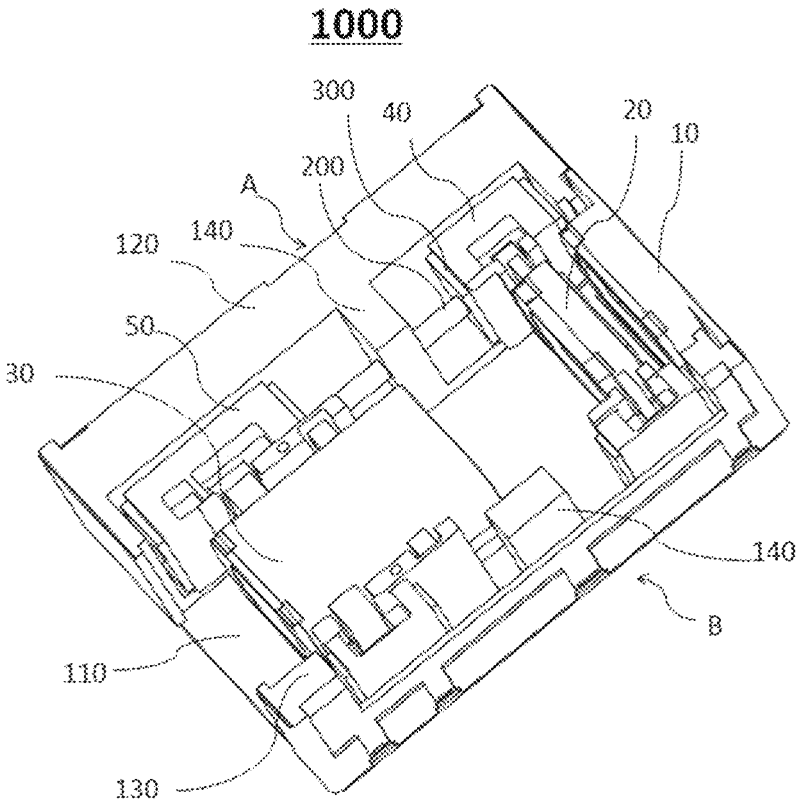
FIG. 3 is a perspective view illustrating an optical zoom module of the embodiment shown in FIG. 2 from another angle.

According to an embodiment of the present invention, an optical zoom module comprising three sub-lenses is provided. Among the three sub-lenses, a sub-lens is a fixed lens and two sub-lens are movable lenses, these lenses are coaxially arranged along an axis (such as the main optical axis), and the two movable lenses can move along the axis, respectively. Further description will be provided below in connection with the accompanying drawings. FIG. 1 is a schematic diagram illustrating the positional relationship of three sub-lenses of an embodiment of the present invention. Referring to FIG. 1, in the present embodiment, three lenses are arranged coaxially along the main optical axis ax. In terms of optical design, the first lens 10 may be a fixed lens, and the second lens 20 and the third lens 30 may be movable lenses. In the present embodiment, the movement of the second lens 20 and the third lens 30 can be limited by using a straight guiding rod 200 to ensure the movement directions of the second lens 20 and the third lens 30 along the same straight line, that is, to ensure the collimation degree of the movement of the second lens 20 and the third lens 30. The sub-lens can be installed in the carrier, and a movable connection is realized between the carrier and the straight guiding rod 200, so that the sub-lens can move along the straight guiding rod 200. In the present embodiment, each of sub-lenses has a lens assembly comprising one or more lenses, for convenience of description, the lens assembly is called lens assembly for short in the present invention. Further, FIG. 2 is a perspective view illustrating an optical zoom module of an embodiment of the present invention. FIG. 3 is a perspective view illustrating an optical zoom module of the embodiment shown in FIG. 2 from another angle. Referring to FIG. 2 and FIG. 3, in the present embodiment, the optical zoom module 1000 comprises a module housing 100, a plurality of lens assemblies (corresponding to the first lens 10, the second the lens 20 and the third lens 30) arranged coaxially along a main optical axis ax, a straight guiding rod 200, a plurality of carriers and a first rail (which is obscured in FIG. 2, has a flat upper surface and is described further below) arranged in the module housing 100. The straight guiding rod 200 is parallel to the main optical axis ax (referring to FIG. 1) and is arranged at a side of the module housing 100, and the first rail is arranged at another side of the module housing 100. For the convenience of description, the side which the straight guiding rod 200 arranged at is referred to as the first side A, and an opposite side is referred to as the second side B in the present invention. In FIG. 2, the first side A is a rear side (i.e., the side in the negative direction of a x-axis in FIG. 2), and the second side B is a front side (i.e., the side in the positive direction of the x-axis in FIG. 2). In the present embodiment, each of the plurality of carriers is installed with a sub-lens, and these sub-lenses can be used to realize different functions respectively. At least two carriers of the plurality of carriers are movable carriers. In the present embodiment, the number of movable carriers is two, and the two movable carriers are the second carrier 40 and the third carrier 50 respectively. The straight guiding rod 200 passes through the two movable carriers (the second carrier 40 and the third carrier 50), so that the two movable carriers (second carrier 40 and the third carrier 50) can moved along the straight guiding rod 200 respectively. The first rail is located on the second side B of the module housing 100, and the first rail (obscured and not shown in FIG. 2) is parallel to the straight guiding rod 200, the first balls are supported between the upper surface of the first rail and the lower surfaces of the movable carriers, so that the movable carriers can be limited in the z-axis direction (which will be described in more details in connection with further embodiments below). At the first side A, the movable carriers can move along the straight guiding rod 200 under the action of a driving element, while at the second side B, under the support of the first rail and the first balls, the movable carriers can move in the xoy plane by the driving element. Due to the limiting effect of the straight rail at the first side, and at the second side, the movable carriers are rigid, the movement direction of the movable carriers is also straight. In general, the present embodiment employs an asymmetrical guiding structure, a straight guiding rod 200 is arranged at a side of the module, and a first rail is arranged at another side of the module, and the first rail realizes movable connection by the first balls and the movable carriers. Compared with the guiding structure having straight guiding rods 200 arranged at both sides, the asymmetric guiding structure of the present embodiment can reduce the space occupied by the straight guiding rod 200 and its matching structure to reduce the width of the module (The width is the dimension in the x-axis direction in FIG. 2, the y-axis direction in FIG. 2 is the main optical axis direction, which can also be called the length direction of the module, and the z-axis direction is the height direction of the module). At the same time, the asymmetric guiding structure of the present embodiment employs a straight guiding rod 200, such that the two movable lens assemblies of the optical zoom module can move more accurately along the same straight line, thereby ensuring the imaging quality of the module effectively.

Figure 4:
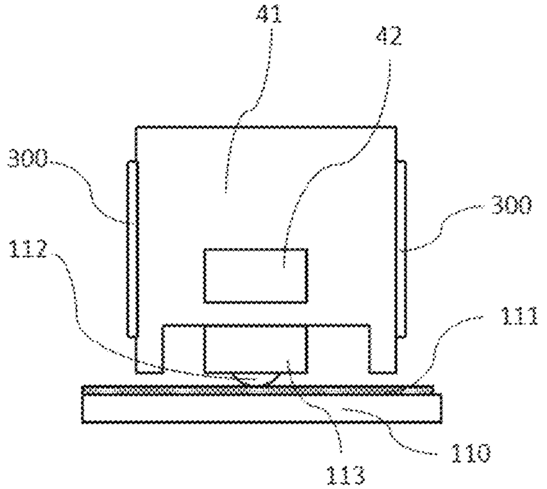
FIG. 4 is a schematic diagram illustrating the connection relationship between the movable carrier and the housing bottom plate in an embodiment of the present invention.

Further, FIG. 4 is a schematic diagram illustrating the connection relationship between the movable carrier and the housing bottom plate in an embodiment of the present invention. Wherein, the first rail has a flat upper surface in the present embodiment. Wherein, the first rail is a strip-shaped metal sheet 111, and the first balls 112 are supported between the upper surface of the metal sheet 111 and the lower surface of the movable carrier 41. Generally speaking, the module housing 100 is made by a molding process (or a plastic processing process, such as, an injection molding process), and the surface of the metal sheet 111 has a higher smoothness than a plastic component, so that a more flatter surface can be defined, so as to keep the movement of the movable lens assembly along the same straight line throughout. At the same time, the metal sheet 111 is used as the surface of the first rail, which can also reduce the resistance of the movement of the movable carrier 41, so as to reduce the driving force required for the driving element and the size of the device. It should be noted that using the metal sheet 111 as the first rail is not the only implementation, and in other embodiments of the present invention, the first rail may also be directly disposed on the housing bottom plate (i.e., the housing bottom plate 110). For example, when the module housing 100 is made, the flatness of the corresponding area of the module bottom plate can be improved by selecting a highly flat mold, or by polishing the corresponding area of the module bottom plate to improve the flatness of the corresponding area of the module bottom plate to form the first rail. In some embodiments of the present invention, the first rail may be arranged in sections, and each first rail section (each first rail section is an independent metal sheet) corresponds to a movable carrier. In other embodiments, the first rail may also be an integral metal sheet, and the movable carriers correspond to different sections of the metal sheet.

Further, in a modified embodiment of the present invention, the first rail can be a guiding groove defined in the housing bottom plate 110, the first ball is arranged in the guiding groove and adapted for rolling along the guiding groove, and the guidance direction of the guiding groove is parallel to the straight guiding rod 200, and the top surface of the first ball supports the lower surface of the movable carrier. The cross-sectional shape of the guiding groove may be arc-shaped to form a better fitting with the first balls. It should be noted that in terms of collimation degree, the machining accuracy of the housing bottom plate 110 may be difficult to reach the level of the straight guiding rod 200, so there may be a drift (or offset) of the first balls in the x-axis direction during the zoom movement, however, the movement path of the movable carrier can still maintain a high collimation degree due to the limiting effect of the straight guiding rod 200 at another side. That is to say, the shift of the first ball position does not affect the collimation degree of the movement path of the movable carrier. In the present embodiment, the guiding groove is defined on the upper surface of the housing bottom plate 110 having an opening facing upwardly. In one embodiment, the guiding groove may have two groove side surfaces and a bottom surface, and the groove side surfaces are perpendicular to the groove bottom surface. In another embodiment, the guiding groove may have an arc-shaped surface matched with a rolling surface to match the first balls better. The bottom surface of the guiding groove or its arc-shaped surface may be regarded as a part of the upper surface of the housing bottom plate 110, in the present embodiment, the bottom surface of the guiding groove or its arc-shaped surface may be regarded as the upper surface of the first rail. The first ball 112 is supported between the upper surface of the first rail and the lower surface of the movable carrier to realize a position limiting in the direction of z-axis, that is, the moving degree of freedom of movement of the movable carrier relative to the first rail is limited in the xoy plane, and there is no movement in the z-axis direction. Furthermore, due to the guiding effect of the straight guiding rod 200 at another side, the movable carrier is also limited in the x-axis direction (that is, the movable carrier does not move in the x-axis direction), so the moving degree of freedom of the movable carrier is actually limited in the y-axis direction, which is consistent with the direction of the straight guiding rod 200. In the present embodiment, the guiding groove and the corresponding lower surface of the movable carrier together define an accommodating structure for accommodating the first ball. It should be noted that in some embodiments of the present invention, the guiding groove may be divided into a plurality of sections (i.e., it may be divided into a plurality of collinear sub-guide-grooves), and each section corresponds to a movable carrier, while in other embodiments, the guiding groove can also be a continuous guiding groove, and different movable carriers respectively correspond to different sections of this continuous guiding groove. That is to say, the first rail may be divided into a plurality of sections, or may be a continuous complete rail.

Further, still referring to FIG. 4, in one embodiment of the present invention, each of the movable carriers 41 (e.g., the second carrier 40 and the third carrier 50) is respectively provided with a groove on a lower surface thereof, and the grooves face has a down-facing opening, wherein the first balls 112 are accommodated in the grooves. In FIG. 4, a boss 113 may be formed at a bottom of the movable carrier 41, and in a bottom view, the boss 113 may be annular to be matched with the periphery edge of the first ball. In other words, the groove with the down-facing opening can be formed in the boss 113, the first ball 112 is arranged in the groove of the boss 113, and the groove can limit the position of the first ball and prevent it from slipping out. In the present embodiment, the groove and the metal sheet 111 define an accommodating structure for accommodating the first balls 112 together. It should be noted that the boss 113 is not necessary for the present invention, in a modified embodiment, the boss 113 can also be removed. For example, a lower surface of the movable carrier 41 can be plane having a circular groove (which refers to a groove having a circular circumference, in bottom view), the circular groove has a down-facing opening, and the first ball is located between the groove and an upper surface of the first rail. Further, in the present embodiment, under the guidance of the straight guiding rod 200, the first balls can move along the first rail when the movable carriers move. The first balls play a supporting role in the z-axis direction, so that both sides of each of the second carrier 40 and the third carrier 50 (i.e., the first side A and the second side B) are balanced, so as to ensure movement accuracy thereof. At the same time, since the first rail is arranged at the bottoms of the second carrier 40 and the third carrier 50, the arrangement of the first rail will not increase the width (which is the dimension in the x-axis direction) of the second carrier 40 and the third carrier 50. Therefore, compared to the solution with arranging the straight guiding rods 200 on both sides, the camera module of the present embodiment can reduce the width (i.e., the size in the x-axis direction), to facilitate the miniaturization of the module. In the present embodiment, the first rail may be a strip-shaped metal sheet, and the metal sheet is arranged on an upper surface of the housing bottom plate 110, but is not limited by the present invention. In another embodiment of the present invention, the first rail may be a guiding groove formed on a surface of the housing bottom plate 110, in the embodiment, the guiding groove and the groove provided on the lower surface of the movable carrier define an accommodating structure for accommodating the first balls, which has a down-facing opening.

Further, in one embodiment of the present invention, in the optical zoom module, the number of the straight guiding rods 200 is one. Compared with the structure with multiple straight guiding rods 200, the smaller number of the straight guiding rod 200 can help reduce the volume occupied by the straight guiding rod 200 and its accessory structure, thereby reducing the volume of the optical zoom module. However, it should be noted that, in other embodiments of the present invention, the number of straight guiding rods 200 may also be two or more. For example, two straight guiding rods 200 may be arranged at different heights on the first side, and each straight guiding rod 200 passes through the second carrier 40 and the third carrier. Since all the straight guiding rods 200 are arranged on the same side of the module housing 100, and the second carrier 40 and the third carrier 50 are supported by the first rail and the first balls 112 on another side, therefore, these modified embodiments of the present invention with multiple straight guiding rods 200 can still reduce the width (i.e., the size of the optical zoom module in the x-axis direction), which facilitates to the miniaturization of the module.

Figure 5:
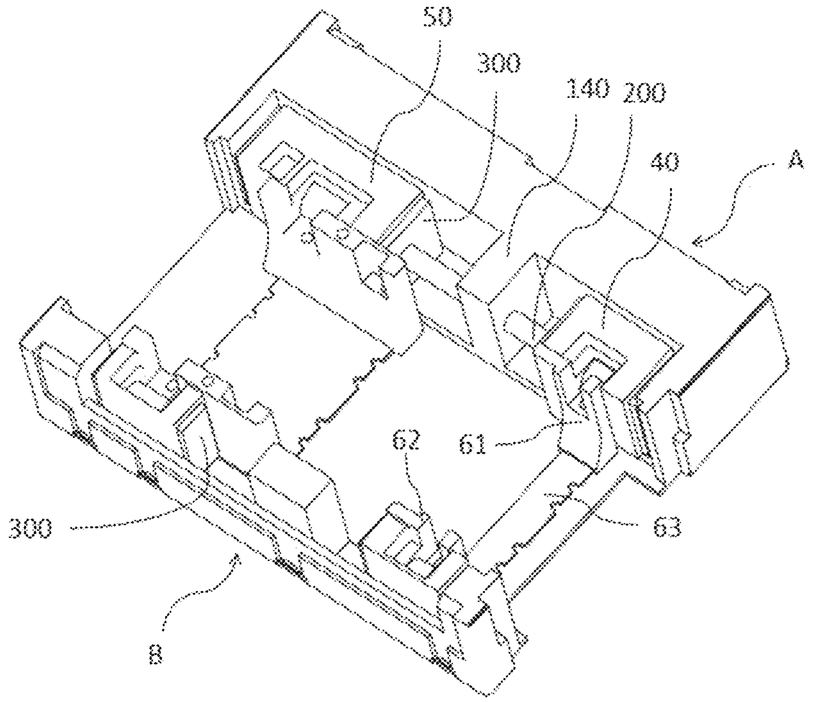
FIG. 5 is a perspective view illustrating an optical zoom module of the present invention, wherein its three sub-lenses are removed.
Figure 6:
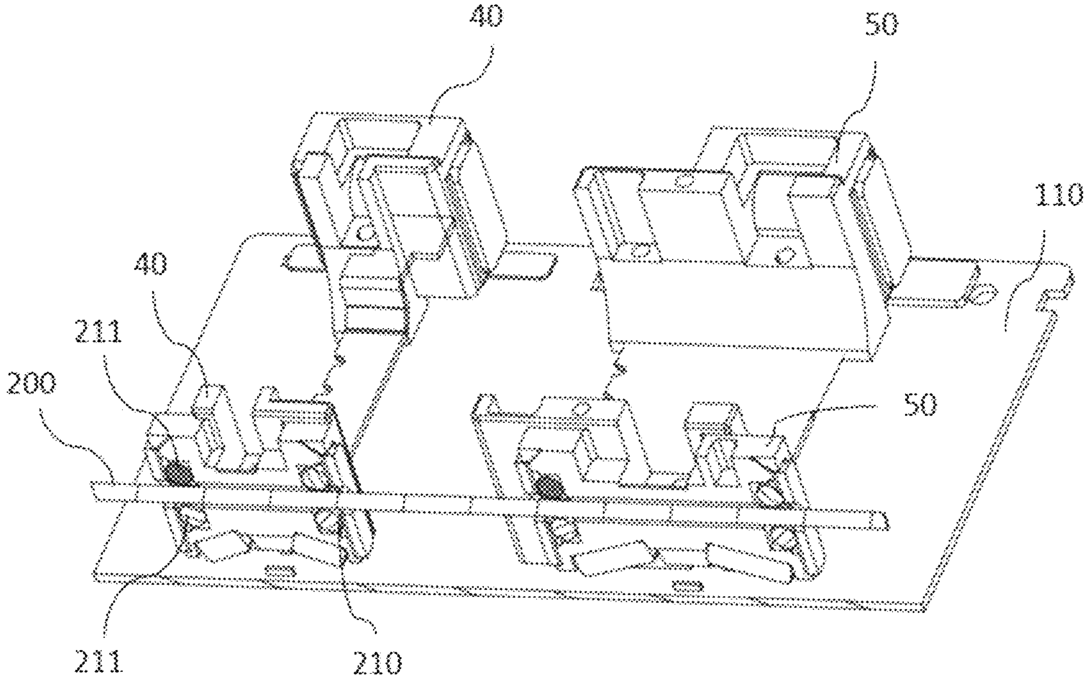
FIG. 6 is a perspective view illustrating an optical zoom module, wherein the optical zoom module is cut open along an axis of an straight guiding rod.

FIG. 5 is a perspective view illustrating an optical zoom module of the present invention, wherein three sub-lenses of the optical zoom module are removed. FIG. 6 is a perspective view illustrating an optical zoom module, wherein the optical zoom module is cut open along an axis of the straight guiding rod 200. For the sake of the concise diagram, FIG. 6 only illustrates the movable carriers (i.e., the second carrier 40 and the third carrier 50), and the housing bottom plate 110. Referring to FIG. 5 and FIG. 6, in an embodiment of the present invention, on the first side A, each of the movable carriers (e.g., the second carrier 40 and the third carrier 50) has a rod matching through hole, the straight guiding rod 200 passes through the rod matching through holes of all movable carriers in sequence. At least one annular accommodating cavity 210 is defined between an inner side surface of the rod matching through hole and the straight guiding rod 200, and a plurality of second balls 211 are provided in the annular accommodating cavity 210, and the straight guiding rod 200 is the second balls 211 is surrounded by the second balls 211 to reduce friction produced when the movable carriers slide along the straight guiding rod 200.

Figure 7:
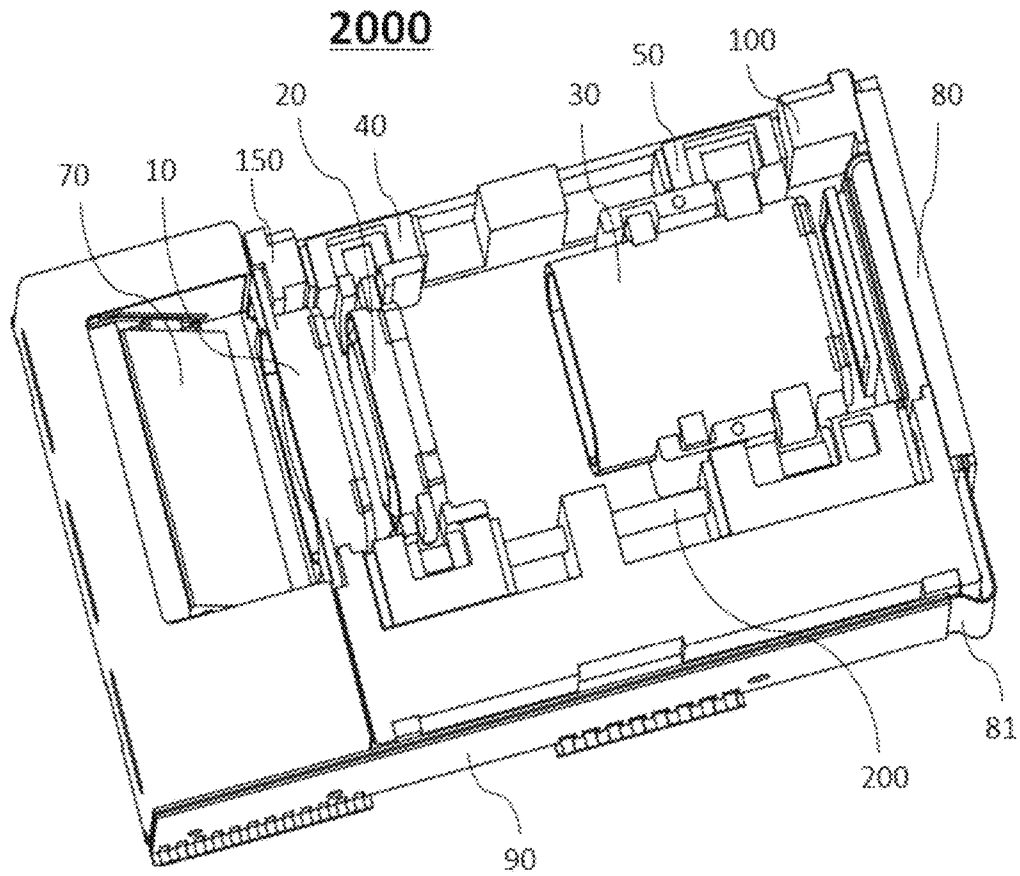
FIG. 7 illustrates a periscopic optical zoom module of an embodiment of the present invention.

Wherein, the optical zoom module is a periscopic optical zoom module. FIG. 7 illustrates a periscopic optical zoom module of an embodiment of the present invention. Referring to FIG. 7, in the present embodiment, the periscopic optical zoom module 2000 comprises a module housing 100, a light refracting element 70, a first carrier, a second carrier 40 and a third carrier 50 which are installed in the module housing 100, and a first sub-lens 10, a second sub-lens 20 and a third sub-lens 30 respectively installed in the first carrier, the second carrier 40 and the third carrier 50. Wherein, the second carrier 40 and the third carrier 50 are movable carriers. The first carrier is a fixed carrier. The first carrier may be directly formed on the module housing 100. In FIG. 7, the first carrier may be a fixed lens supporting member 150 formed on the module housing 100. A rod matching through hole is provided in one side of each movable carrier (e.g., the first side A), and at least one straight guiding rod 200 passes through all the movable carriers (which referring to the second carrier 40 and third carrier 50 in the embodiment) through the rod matching through hole. The first balls are provided on a bottom surface of another side (for example, the second side B) of each movable carrier (specifically, the first balls can be provided in the grooves concaved on the lower surfaces of the movable carriers), and a first rail may be provided on an upper surface of the housing bottom plate 110, and the upper surface of the first rail is flat to support the first balls and allow the first balls to move (including rolling and sliding) in a xoy plane. In the present embodiment, the light reflecting element 70 is used to reflect an incident light from an incident path to an imaging path, an optical center of the incident path defines an incident optical axis, and an optical center of the imaging path defines a main optical axis ax, the incident optical axis is perpendicular to the main optical axis ax. In the present embodiment, the light reflecting element 70 can rotate the incident light by 90 degrees to reduce the size occupied by the module in the thickness direction of a mobile phone (or other electronic devices).

Figure 8:
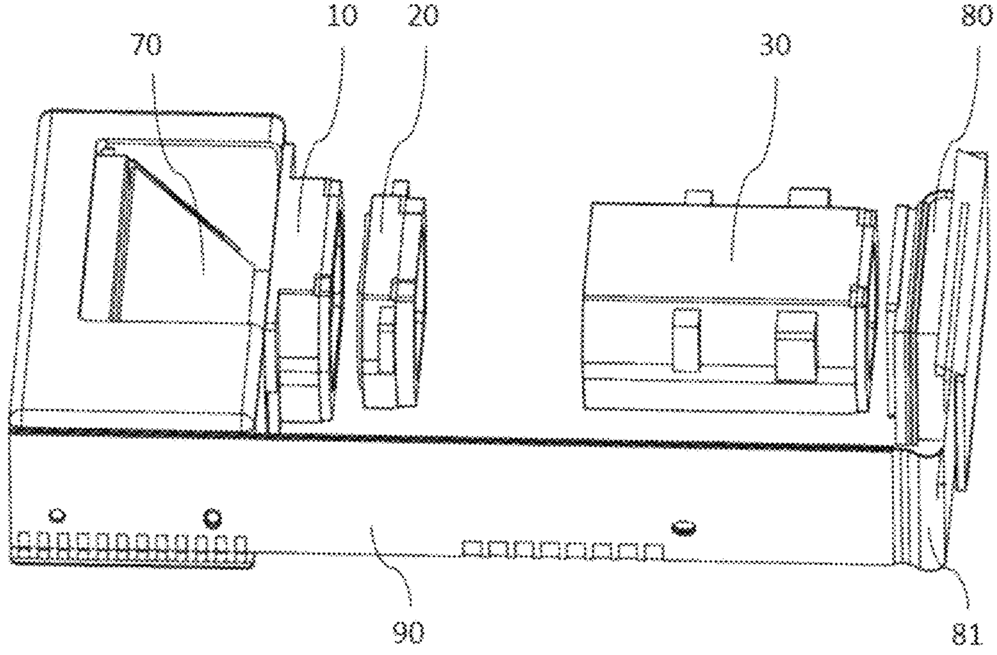
FIG. 8 illustrates the positional relationship of optical components of an embodiment of the present invention.

Further, FIG. 8 illustrates the positional relationship of optical components of an embodiment of the present invention. Referring to FIG. 7 and FIG. 8, in the periscopic optical zoom module 2000, the first carrier is a fixed carrier, and a fixed sub-lens (i.e., the first sub-lens 10) is installed in the fixed carrier. A zoom sub-lens (that is, the second sub-lens 20) is installed in the second carrier 40, and the zoom sub-lens has a zoom lens assembly, in the present embodiment, the focal length of the entire imaging system (i.e., the focal length of the entire optical zoom module) can be adjusted by the moving the zoom lens assembly along the optical axis. A compensation sub-lens (i.e., the third sub-lens 30) is installed in the third carrier 50, and a compensation lens assembly is installed in the compensation sub-lens. In the embodiment, the compensation lens assembly realizes focusing of the imaging system to compensate the focus shift caused by the movement of the zoom lens assembly. In the embodiment, the fixed sub-lens, the zoom sub-lens, and the compensating sub-lens are sequentially arranged from an object side to an image side along the main optical axis ax (refers to FIG. 1). The light reflecting element 70 may be disposed at a position closest to the object side, and the fixed sub-lens is disposed at the exit end of the light reflecting element 70.

Further, still referring to FIG. 8, in an embodiment of the present invention, in the optical zoom module, the optical zoom module may further comprise a photosensitive assembly 80, and the photosensitive surface of the photosensitive assembly 80 is substantially perpendicular to the main optical axis ax (referring to FIG. 1), that is, the photosensitive surface is substantially perpendicular to the axis of the straight guiding rod 200.

Further, in an embodiment of the present invention, in the optical zoom module, the straight guiding rod 200 is fixed to the module housing 100, at the first side A, and the movable carrier is supported by the straight guiding rod 200 and a gap is defined between the lower surface of the movable carrier and the housing bottom plate 110, that is, at the first side A, the movable carrier can be suspended.

Figure 9:
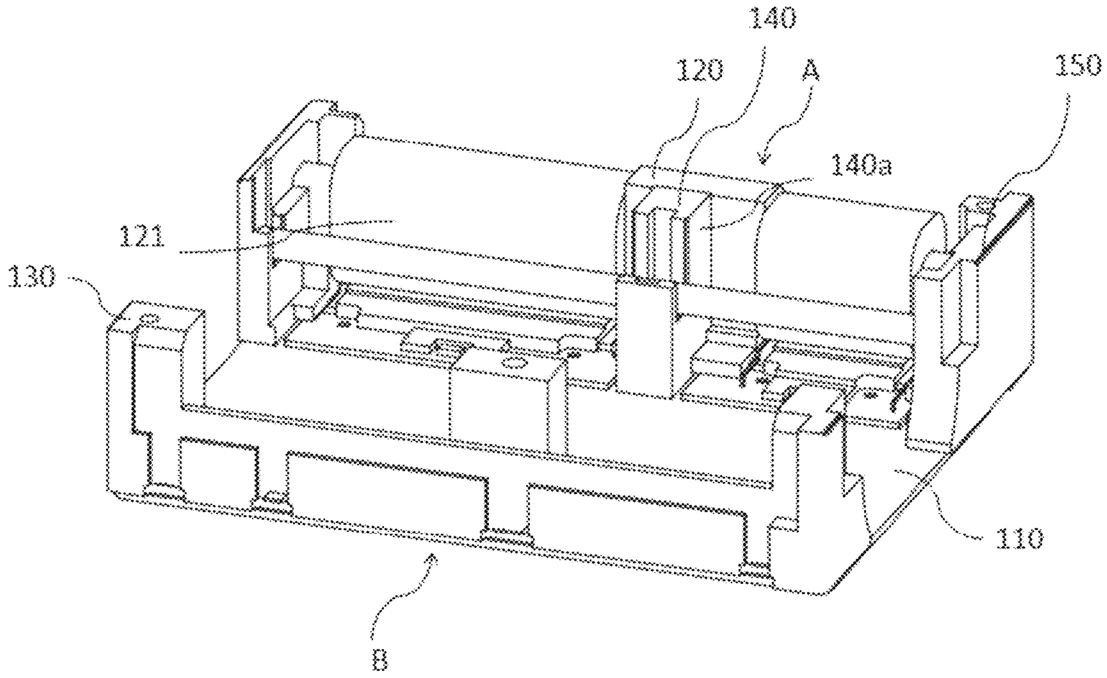
FIG. 9 is a perspective view illustrating a module housing and a straight guiding rod of an embodiment of the present invention.
Figure 10:
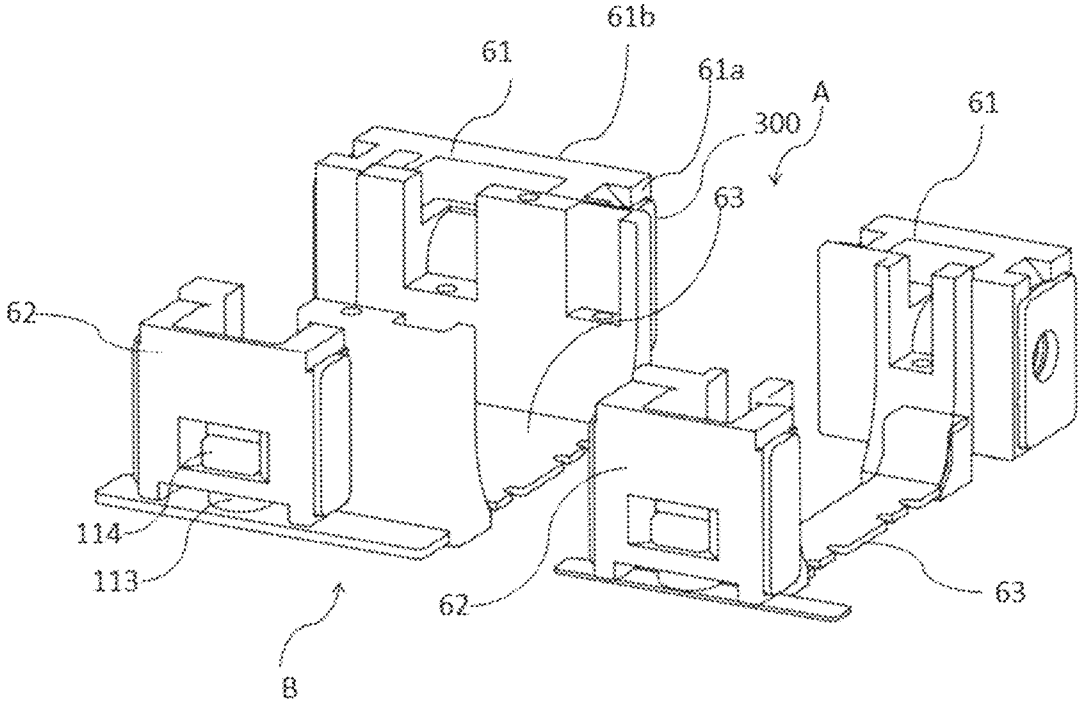
FIG. 10 is a perspective view illustrating a perspective view of two movable carriers.
Figure 11:
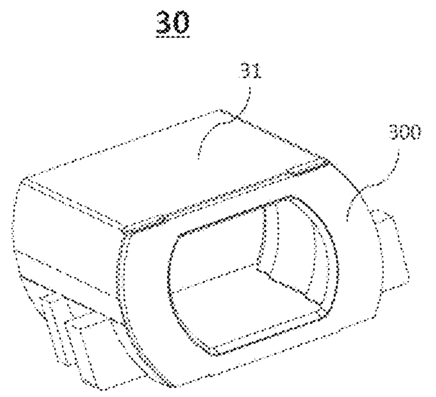
FIG. 11 is a perspective view illustrating a third sub-lens.

Further, FIG. 9 is a perspective view illustrating a module housing 100 and a straight guiding rod 200 of an embodiment of the present invention. Referring to FIG. 9, in the present embodiment, the module housing 100 comprises a housing bottom plate 110, two housing side walls 120, 130 and a cover. wherein, referring to FIG. 3, the housing side walls 120, 130 are respectively located at the first side A and the second side B of the module housing 100, the cover is not shown in FIG. 9, which is usually covered on the bottom plate or the housing side walls 120, 130 to make the module housing 100 form a closed structure to protect every of internal components. Furthermore, FIG. 10 is a perspective view illustrating two movable carriers. Referring to FIG. 10, in the present embodiment, the movable carrier comprises a first sliding mounting member 61, a first sliding portion 62, and a carrier bottom plate 63 connected with the first sliding mounting member 61 and the first sliding portion 62. Wherein, the first sliding mounting member 61 is located at the first side A of the module housing 100. The first sliding portion 62 is located at the second side B of the module housing 100. The first sliding mounting member 61, the first sliding portion 62 and the carrier bottom plate 63 define a U-shaped groove, and each of the sub-lenses is installed in the U-shaped groove. Each of the sub-lenses comprises a lens barrel 31 and a lens assembly installed in the lens barrel 31 (i.e., lens assembly). For example, FIG. 11 is a perspective view illustrating a third sub-lens. Referring to FIG. 11, the third sub-lens 30 may comprise a lens barrel 31 and a lens assembly (usually including a plurality of lenses) installed therein. The lens assembly is assembled through the lens barrel 31. An outer side surface of the lens barrel 31 is fixed to an inner side surface of the U-shaped groove (such as being bonded at). A gap is provided between the carrier bottom plate 63 of the movable carrier and the housing bottom plate 110.

Furthermore, still referring to FIG. 9 and FIG. 10, in one embodiment of the present invention, the module housing 100 comprises a housing bottom plate 110, two housing side walls 120, 130 and a cover. Wherein, the housing side walls 120 has a limiting structure 140, wherein the limiting structure 140 is provided between the first sliding mounting members 61 of two adjacent movable carriers (such as the second carrier 40 and the third carrier 50), and the straight guiding rod 200 passes through at least two first sliding mounting members 61 of the two movable carriers and the limiting structure 140. In the embodiment, the limiting structure 140 can respectively restrict the moving strokes of the second carrier 40 and the third carrier 50 within their respective predetermined ranges. Furthermore, in the present embodiment, a buffer layer 300 is provided on an end surface of the first sliding mounting member 61 and/or an end surface of the limiting structure 140. The end surface herein refers to the surface perpendicular to the axis of the straight guiding rod 200, for the first sliding mounting member 61, a surface 61*a* facing the limiting structure 140 is the end surface thereof, for the limiting structure 140, a surface 140*a* facing the first sliding mounting member 61 is the end surface thereof, the buffer layer 300 is provided on the end surface of the first sliding mounting member 61 and/or the end surface of the limiting structure 140 can prevent the movable carriers from colliding with the limiting structure 140 when they moves. Specifically, the inventors of the present invention found that in order to realize the fast zoom function, the movable carriers are needed to move quickly. This result in the driving elements to provide a larger driving force for the movable carrier, and a larger driving force may cause the movable carrier to move excessively beyond the position required for zooming. Although in practical use, the position of the movable carrier can also be readjusted by changing the direction of the driving force, etc., this situation still affects the actual user experience. For example, in some cases, excessive movement due to excessive instantaneous driving force, the movable carrier may collide with the limiting structure 140, and the sound of the collision will bring negative impact on the user (consumers) experience. In addition, for the optical zoom module based on the straight guiding rod 200, since the moving resistance of the movable carrier is greatly reduced, even if the user is not performing zoom shooting, when the external impact/collision force on the terminal device (such as a mobile phone) equipped with the optical zoom module is large, it may also cause the movable carrier to collide with the limiting structure 140, causing abnormal sounds in the mobile phone, which will bring unpleasantness to the user and impact the user experience. However, in the present embodiment, a buffer material (which defines the buffer layer 300) is provided on the end surface of the first sliding mounting member 61 and/or the end surface of the limiting structure 140, which can effectively avoid the abnormal sound caused by the collision between the movable carrier and the limiting structure 140.

Furthermore, in another embodiment of the present invention, in the optical zoom camera module, the housing sidewall has a limiting structure 140 on the first side A (i.e., the side wherein the straight guiding rod 200 is located), the limiting structure 140 is provided between the first sliding mounting members 61 of the two adjacent movable carriers, and the straight guiding rod 200 passes through the at least two first sliding mounting members 61 of the movable carrier and the limiting structure 140. Wherein, a corresponding camera lens is provided in the U-shaped groove of the two adjacent movable carriers. The lens may comprise a lens barrel 31 and a lens assembly installed in the lens barrel 31, and a buffer layer may be provided on an end surface of the lens barrel 31 (referring to FIG. 11, the buffer layer 300 may be provided at the end surface of the lens barrel 31). The buffer layer mounted on the end surface of the lens barrel 31 can also prevent the movable carrier from colliding with the limiting structure 140 during the zooming process.

Furthermore, in an embodiment of the present invention, the movable carrier is driven by a first magnet and a coil. Specifically, the driving element may be arranged on each side (i.e., the first side A and the second side B) of the optical zoom module. Specifically, the first magnet may be provided on an inner side surface 121 (referring to FIG. 9) of the housing sidewall 120, and the coil may be provided on an outer side surface 61*b* of the movable carrier (referring to FIG. 10). Wherein, the inner side surface 121 refers to the side surface of the housing sidewall 120 which is close to the lens assembly (that is, close to the optical axis), and the outer side surface 61*b* refers to the side surface of the movable carrier which is away from the lens assembly (that is, away from the optical axis). FIG. 9 and FIG. 10 only illustrate the inner side surface of the housing sidewall and the outer side surface of the movable carrier at the first side A, it should be noted that at the second side B, the first magnet and the coil can be respectively provided on the inner side surface of the housing sidewall and the outer side surface of the movable carrier. In another embodiment, the driving element can also be arranged only on a single side (for example, it can be arranged only at the side where the straight guiding rod 200 is located).

Furthermore, still referring to FIG. 10, in an embodiment of the present invention, the movable carrier comprises a first sliding mounting member 61 located at the first side A, a first sliding portion 62 located at the second side B, and a carrier bottom plate 63 provided to connect the first sliding mounting member 61 and the first sliding portion 62, wherein the first sliding mounting member 61, the first sliding portion 62 and the carrier bottom plate 63 define a U-shaped groove, and the sub-lens is installed in the U-shaped groove. The first magnet is disposed on the inner side surface of the housing sidewall at the first side A of the camera module (i.e., the side having the straight guide), and the coil is disposed on the outer side surface of the first sliding mounting member 61 of the movable carrier.

Furthermore, still referring to FIG. 10, in an embodiment of the present invention, a bottom surface of each of the first sliding portions 62 (i.e., each first sliding portions 62 of the movable carrier) has a groove having a down-facing opening (in the embodiment, referring to FIG. 4, the groove could be defined in annular boss 113), the first balls are installed in the grooves, and the bottom surface (i.e., the bottom surface of the groove, since the opening of the groove faces downwardly in the present embodiment, the bottom surface of the groove actually corresponds to the top surface of the first ball) of the first sliding portion 62 and the upper surface of the first rail are supported by the first balls. In the present embodiment, the first rail can be an independent metal sheet 111 (e.g., a steel sheet), and the metal sheet 111 may be disposed on the upper surface of the housing bottom plate 110 (referring to FIG. 9) of the module housing 100. The first rail has a magnetic conductive material (for example, the first rail is made of a magnetic conductive material or is attached with a magnetic conductive material). In the present embodiment, a second magnet 114 may also be disposed above the groove accommodating the first ball therein (that is, the second magnet 114 may be located directly above the first ball), and a magnetic force is formed between the second magnet 114 and the first rail (metal sheet 111), which can make the groove bottom surface of the groove (which actually corresponding to a top surface of the first ball since the opening of the groove faces downwardly) and the upper surface of the first rail clamp the first balls to avoid uncontrolled sliding of the movable carrier along the straight guiding rod 200 when its driving element is not energized. When the driving element is energized, the driving force along the straight guiding rod 200 direction (i.e., the y-axis direction) can overcome the friction of the first balls and push the movable carrier to move in the y-axis direction under the action of the driving element. In addition, the magnetic force formed between the second magnet 114 and the first rail (metal sheet 111) also helps to limit the first balls in the grooves to prevent the first balls from slipping off.

Figure 12:
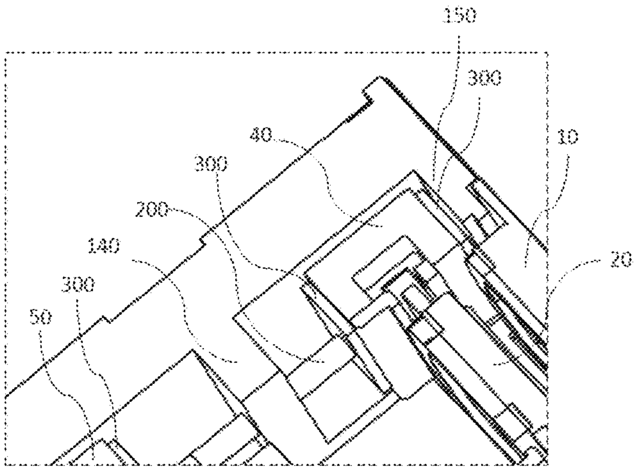
FIG. 12 is a sectional perspective view illustrating a camera module of an embodiment of the present invention.

Further, in the present invention, the buffer layer may be provided on the end surface of the limiting structure 140 or on the end surface of the movable carrier. Generally speaking, the buffer layer only needs to be disposed between the end surface of the limiting structure 140 and the end surface of the movable carrier. Even further, the limiting structure 140 can not only be arranged between two adjacent movable carriers, but also between the photosensitive assembly supporting member and the movable carriers, or between the fixed carrier supporting member (or fixed lens supporting member 150) and the movable carriers. For example, FIG. 12 is a sectional perspective view illustrating a camera module of an embodiment of the present invention. Referring to FIG. 12, in the present embodiment, a buffer layer 300 may be provided between the end surface of the movable carrier (the second carrier 40) and the end surface of the fixed lens supporting member 150, and a buffer layer 300 can also be provided between the end surface of the photosensitive assembly supporting member (not shown in FIG. 12) and the end surface of the movable carrier (such as the third carrier 50), these designs can further prevent the terminal device (such as mobile phones) from making a sound or vibration by the collision of the movable carrier during use, thereby improving the user experience. The fixed lens supporting member 150 and the photosensitive assembly supporting member may be a part of the module housing 100 and integrally formed with the module housing 100. Among them, the fixed lens supporting member 150 can limit the moving stroke of the movable carrier at a front end (i.e., one end of the object side), and the photosensitive assembly supporting member can limit the moving stroke of the movable carrier at a rear end (i.e., one end of the image side), so both of fixed lens supporting member 150 and the photosensitive assembly supporting member can also be regarded as limiting structure 140.

Figure 13:
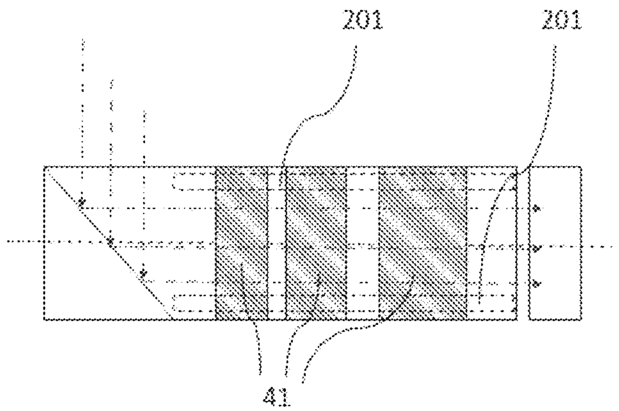
FIG. 13 illustrates an optical path of a periscopic optical zoom module of a modified embodiment of the present invention.

Further, in the present invention, the combination of sub-lenses of the periscopic optical zoom module is not limited to a combination of one fixed lens and two movable lenses. For example, FIG. 13 illustrates an optical path of a periscopic optical zoom module of a modified embodiment of the present invention. Referring to FIG. 13, the modified embodiment comprises one light reflecting element 70 and three movable lenses, and the three movable lenses are respectively mounted on the three movable carriers 41. Moreover, in the modified embodiment, the module may have two straight guiding rods 201 located at different heights, and each straight guiding rod 200 passes through the three movable carriers 41. In the present embodiment, the two straight guiding rods 201 are located at the same side of the module, and a first rail and a corresponding first ball structure are provided at another side of the module to provide support for the movable carrier in the z-axis direction, balancing both sides of the movable carrier.

It should be noted that, in the present invention, the buffer layer in the aforementioned embodiment can also be applied to an optical zoom module with straight guides on both sides to improve the collimation degree of zoom movement while taking into account the user experience. For example, in another embodiment of the present invention, the optical zoom module may comprise a module housing 100, a plurality of carriers installed in the module housing 100, and a plurality of lens assemblies installed in the plurality of carriers. At least two carriers of the plurality of carriers are movable carriers. both sides of the module housing 100 are provided with straight guiding rods 200, and each straight guiding rod 200 passes through the at least two movable carriers, so that each movable carrier can move along the straight guiding rod 200 to achieve zoom or focus function within a predetermined travel range. Further, the straight guiding rods 200 on both sides are parallel to the y-axis (parallels to the main optical axis of the optical zoom module, and the direction about the y-axis can refer to FIG. 2). A limiting structure 140 may be provided between two adjacent movable carriers, and the limiting structure may be integrally formed with the module housing 100, that is, the limiting structure 140 may be a part of the module housing 100. For example, in one embodiment, the module housing 100 may comprise a housing bottom plate 110, a housing sidewall, and a cover. Wherein, the limiting structure 140 can be integrally molded with the housing sidewall. In the present embodiment, a buffer layer is provided on the end surface (that is, the surface of the limiting structure 140, which is perpendicular to the main optical axis) of the limiting structure 140, and the buffer layer may be made of an elastic material. The buffer layer can be pasted on the limiting structure 140, or coating directly and evenly adhesive material on the limiting structure 140 to enable an elastic buffer layer to be formed after the adhesive material is cured. After the buffer layer is provided, so that sound or vibration caused by the collision of the movable carrier (such as the collision of limiting structure 140) during the use of the terminal device (e.g., mobile phones) is avoided, thereby improving the user experience. Further, the buffer layer may be provided on the end surface of the movable carrier. Generally speaking, the buffer layer only needs to be disposed between the end surface of the limiting structure 140 and the end surface of the movable carrier. Even further, the limiting structure 140 can not only be arranged between two adjacent movable carriers, but also between the photosensitive assembly supporting member and the movable carriers, or between the fixed carrier and the movable carriers. Referring to FIG. 12, in the present embodiment, a buffer layer may be provided between the end surface of the movable carrier (the second carrier 40) and the end surface of the fixed carrier supporting member, and the buffer layer can also be provided between the end surface of the photosensitive assembly supporting member and the end surface of the movable carrier, these designs can further prevent the mobile phone from making a sound or vibration by the collision of the movable carrier during use, thereby improving the user experience. The fixed carrier supporting member and the photosensitive assembly supporting member may be a part of the module housing 100 and integrally formed with the module housing 100. Among them, the fixed carrier supporting member can limit the moving stroke of the movable carrier at a front end (one end of the object side), and the photosensitive assembly supporting member can limit the moving stroke of the movable carrier at a rear end (one end of the image side), so both of fixed carrier supporting member and the photosensitive assembly supporting member can also be regarded as a limiting structure 140.

Further, for the optical zoom module with straight guiding rods 200 at both sides thereof, the buffer layer can also be arranged on the end surface of the lens barrel 31 of the movable lens assembly, this solution can also prevent the mobile phones from making a sound or vibration by the collision of the movable carrier during use, thereby improving the user experience. In specific implementation, for example, a buffer layer can be attached to the end surface of the lens barrel 31 of the lens, firstly, and then the lens is installed in the corresponding carrier.

Further, in an embodiment of the present invention, the buffer layer may be a polymer layer with elasticity (e.g., a silica gel layer), and the silica gel layer may be integrated with the movable carrier (or integrated with the limiting structure 140 on the module housing 100) by molding or injection molding process. For example, when the movable carrier be mold by the injection molding process, LCP (LIQUID CRYSTAL POLYMER, which can be translated as liquid crystal polymer) material can be injected into the mold first, and when a certain amount is reached, the silica gel material can be injected onto a surface of LCP material, after cooling and solidifying, LCP material forms a body portion of the movable carrier, and the silica gel material forms a film adhering to the body portion of the movable carrier. The above injection molding process can also be replaced by a molding process, which will not be repeated here. Further, in some modified embodiments, the movable carrier may also have a metal plate, which can play a reinforcing role so that when the thickness of LCP material of the movable carrier is small, it still has sufficient structural strength. The metal plate can also be integrated with the body portion (i.e., LCP structure) and the silica gel film during the injection or molding process of the movable carrier.

Further, in an embodiment of the present invention, the silica gel layer may be an ethyl carbamate film. The selection of the elastic polymer material can be based on the following considerations: the material has a certain flexibility at normal temperature, that is, the material will elastically deform when it collides with other rigid blocks, and it will return to the initial state after the external force disappears and will not produce debris, and it has good compatibility with the production material of the movable carrier (or the rigid structure that other buffer layers need to attach to, such as the limiting structures 140) in the high-temperature liquefaction state. On the other hand, the physical properties of the material should be relatively stable, and when the temperature reaches 80° C., its state will not change significantly, such as changing from solid to liquid. Preferably, the ethyl carbamate meets all the above conditions and is molded onto the surface of the carrier to achieve a buffering effect during the collision process. It should be noted that although the elastic material layer in the embodiment is a film, the present invention is not limited to this. For example, in other embodiments of the present invention, the elastic material layer may has a relatively large thickness (e.g., greater than the thickness of the film) may also be used as the buffer layer.

Further, in an embodiment of the present invention, the end surface of the movable carrier may be a flat surface, the elastic material layer (such as a silica gel layer) is directly attached to the flat surface. The elastic material layer can be integrated on the end surface of the movable carrier by injection molding or molding process. In another embodiment of the present invention, the end surface of the movable carrier may form a buffer layer accommodating groove, the buffer layer may be filled in the buffer layer accommodating groove, and the surface of the buffer layer protrudes beyond the end surface of the movable carrier, so that the end surface of the movable carrier can be effectively protected by the buffer layer when a collision occurs.

In the above embodiments, the method of making the buffer layer on the end surface of the movable carrier is only an example, and is not used to limit the present invention. The above method for forming the buffer layer on the end surface of the movable carrier can also be applied to those embodiments in which the buffer layer is formed on the end surface of the limiting structure 140 or the end surface of the lens barrel 31.

Further, the above-mentioned buffer layers are all made of buffer materials (elastic materials), but the present invention is not limited to this, for example, a structure defined by a spring and a baffle can be used to achieve a buffering effect. For example, in some modified embodiments of the present invention, a baffle supported by a plurality of springs may be installed on the end surface of the limiting structure 140, and the surface of the baffle may be perpendicular to the main optical axis (i.e., parallel to the end surface of the limiting structure 140). This buffering structure can also prevent the mobile phones from making a sound or vibration by the collision of the movable carrier during use, thereby improving the user experience.

Further, in some other modified embodiments of the present invention, the above buffer layer may also be directly formed by a spring, for example, the end surface of the limiting structure 140 and the end surface of the movable carrier (the two end surfaces here refer to the limiting structure 140 and the two end surfaces of the movable carrier facing each other) can be connected using a spring, so that the spring can act as a buffer when the movable carrier moves to prevent the mobile phone from making a sound or vibration by the collision of the movable carrier during use, thereby enhancing the user experience.

Further, in some modified embodiments of the present invention, the optical zoom module may also be provided with the buffer layer (also referred to as a side buffer layer) on the outer side surface of the movable carrier and/or the inner side surface of the housing sidewall, to further serve as an anti-collision function. For example, when the terminal device is severely impacted, the side buffer layer can further reduce the risk of collision of the movable carrier.

The optical zoom module of the present invention is particularly suitable for use in portable terminal devices such as smart phones and tablet computers. The optical zoom module not only has the advantages of small size and compact structure, but also has extremely high collimation degree of the zoom movement of its movable parts, which is conducive to improving the imaging quality, and the optical zoom module of the present invention can also prevent the collision of movable parts in the module caused by various factors such as collision and shaking of the portable terminal device, thereby avoiding problems such as abnormal noise from the portable terminal devices and significantly improving the user experience.

The above description is only a preferred embodiment of the present invention and the explanation of the applied technical principles. Those skilled in the art should understand that the scope of the invention involved in the present invention is not limited to the technical solutions formed by the specific combinations of the above technical features, and should also cover other technical solutions formed by any combination of its equivalent features without departing from the concept of the invention. For example, a technical solution is formed by replacing the above features with the technical features disclosed in the present invention (but not limited to) with similar functions.

What is claimed is:

1. An optical zoom module, comprising:

a module housing;

a plurality of lens assemblies arranged coaxially along an axis;

at least one straight guiding rod, which is parallel to the axis and is arranged at a first side of the module housing;

a plurality of carriers, wherein each carrier has a lens assembly mounted therein, and at least two carriers of the plurality of carriers are movable carriers, and the straight guiding rod passes through the at least two movable carriers to enable the at least two movable carriers to move along the straight guiding rod respectively; and a first rail located on a second side of the module housing, wherein the second side is opposite to the first side, wherein the first rail is parallel to the straight guiding rod, and at least one first ball is supported between an upper surface of the first rail and a lower surface of each of the at least two movable carriers, wherein each of the at least two movable carriers has a straight guiding rod matching through hole at the first side of the module housing, and the straight guiding rod passes through the straight guiding rod matching through hole of each of the at least two movable carriers in sequence, wherein the at least two movable carriers are supported by the straight guiding rod.

2. The optical zoom module, as recited in claim 1, wherein the first rail has a flat upper surface, the first rail is a strip-shaped metal sheet, and the at least one first ball is supported between the upper surface of the metal sheet and the lower surface of each of the at least two movable carriers.

3. The optical zoom module, as recited in claim 1, wherein the first rail has a flat upper surface, and the first rail is directly formed on an upper surface of a housing bottom plate.

4. The optical zoom module, as recited in claim 1, wherein on the second side of the module housing, the lower surface of each of the at least two movable carriers has a groove with a down-facing opening, the at least one first ball is received in the groove and clamped between the groove and the first rail.

5. The optical zoom module, as recited in claim 1, wherein at least one annular accommodating cavity is formed between an inner side surface of the straight guiding rod matching through hole and the at least one straight guiding rod, and a plurality of second balls are provided in the annular accommodating cavity, and the plurality of second balls are provided to surround the at least one straight guiding rod.

6. The optical zoom module, as recited in claim 1, further comprising a light reflecting element the light reflecting element is used to reflect an incident light from an incident path to an imaging path, wherein an optical center of the incident path defines an incident light axis, an optical center of the imaging path defines a main optical axis, and the incident light axis is perpendicular to the main optical axis.

7. The optical zoom module, as recited in claim 6, wherein the plurality of carriers comprises a fixed carrier and two movable carriers, wherein a fixed lens assembly is installed in the fixed carrier, and a zoom lens assembly and a compensation lens assembly are respectively installed in the two movable carriers, wherein the zoom lens assembly is arranged for adjusting a focal length of an imaging system, and the compensation lens assembly is used for realizing focusing of the imaging system to compensate a focus shift caused by motion of the zoom lens assembly, the fixed lens assembly, the zoom lens assembly and the compensation lens assembly are arranged from an object side to an image side in sequence.

8. The optical zoom module, as recited in claim 7, further comprising a photosensitive assembly, wherein the photosensitive assembly comprises a first circuit board and a photosensitive chip provided on a surface of the first circuit board, wherein a flexible connecting belt is provided at the side of the first circuit board, wherein the flexible connecting belt is bent to the first side or the second side of the module housing, a second circuit board is provided at the first side or the second side of the module housing, wherein the second circuit board is electrically communicated with the first circuit board through the flexible connecting belt.

9. The optical zoom module, as recited in claim 1, wherein the first rail is a guiding groove defined in the housing bottom plate, the at least one first ball is arranged in the guiding groove and adapted for rolling along the guiding groove, and a guiding direction of the guiding groove is parallel to the straight guiding rod, and a top surface of the at least one first ball supports the bottom surface of each of the at least two movable carriers.

10. The optical zoom module, as recited in claim 9, wherein each of the at least two movable carrier comprises a first sliding mounting member located at the first side, a first sliding portion located at the second side, and a carrier bottom plate provided to connect the first sliding mounting member and the first sliding portion, wherein the first sliding mounting member, the first sliding portion and the carrier bottom plate define a U-shaped groove, and at least lens assembly is installed in the corresponding U-shaped groove, the lens assemblies are assembled through a lens barrel, and an outer side surface of the lens barrel is fixed on an inner side surface of the U-shaped groove.

11. The optical zoom module, as recited in claim 10, wherein the housing sidewall has a limiting structure at the first side, wherein the limiting structure is provided between the first sliding mounting members of two adjacent movable carriers, and the straight guiding rod passes through the first sliding mounting members of the two movable carriers and the limiting structure a buffer layer is provided on an end surface of the first sliding mounting member and/or an end surface of the limiting structure.

12. The optical zoom module, as recited in claim 10, wherein the housing sidewall has a limiting structure at the first side, wherein the limiting structure is provided between the first sliding mounting members of two adjacent movable carriers, and the straight guiding rod passes through the first sliding mounting members of the two movable carriers and the limiting structure, and a buffer layer is provided on an end surface of the lens barrel in the U-shaped groove provided between two adjacent movable carriers.

13. The optical zoom module, as recited in claim 9, wherein each of the at least two movable carriers is driven by a first magnet and a coil the first magnet is disposed on an inner side surface of the housing sidewall, and the coil is disposed on an outer side surface of each of the at least two movable carriers.

14. The optical zoom module, as recited in claim 13, wherein each of the at least two movable carriers comprises a first sliding mounting member, a first sliding portion and a carrier bottom plate provided to connect the first sliding mounting member with the first sliding portion, wherein the first sliding mounting member is located at the first side of the module housing, the first sliding portion is located at the second side of the module housing, wherein the first sliding mounting member, the first sliding portion and the carrier bottom plate define a U-shaped groove, the lens assemblies are installed in the U-shaped groove, wherein the first magnet is disposed on an inner side surface of the housing sidewall at the first side, and the coil is disposed on an outer side surface of the first sliding mounting member of each of the at least two movable carriers.

15. The optical zoom module, as recited in claim 10, wherein a bottom surface of each of the first sliding portions has a groove, the at least one first ball is installed in the groove of each bottom surface, and the bottom surface of each of the first sliding portions and an upper surface of the first rail are supported by the at least one first ball.

16. The optical zoom module, as recited in claim 15, wherein the first rail contains a magnetic conductive material, a second magnet is installed above the groove and at the each of the first sliding portions, and a magnetic force between the second magnet and the first rail is configured to enable the groove and the first rail to clamp the at least one first ball therebetween.

17. An optical zoom module, comprising:

a plurality of sub-lenses arranged coaxially along an axis, each of sub-lenses comprises a lens assembly and a lens barrel for supporting and assembling the lens assembly therein;

at least one straight guiding rod parallel to the axis;

a plurality of carriers, wherein each carrier is provided with one of the plurality of sub-lenses, and at least two carriers of the plurality of carriers are movable carriers, and the at least one straight guiding rod passes through the at least two movable carriers to enable the at least two movable carriers to move along the at least one straight guiding rod respectively;

a plurality of limiting structures, relative positions between the at least one straight guiding rod and the plurality of limiting structures are fixed, and the plurality of limiting structures are arranged at both ends of the moving path of each of the at least two movable carrier to limit moving stroke of each of the at least two movable carrier, and a buffer layer arranged on an end surface each of the plurality of limiting structures, which faces the movable carrier, or on an end surface of each of the at least two movable carriers, which faces a corresponding limiting structure of the plurality of limiting structures, or on an end surface of the lens barrel, wherein each of the at least two movable carriers has a straight guiding rod matching through hole at the first side of the module housing, and the straight guiding rod passes through the straight guiding rod matching through hole of each of the at least two movable carriers in sequence, wherein the at least two movable carriers are supported by the straight guiding rod.

18. The optical zoom module, as recited in claim 17, further comprising a module housing, and both sides of the module housing are provided with the straight guiding rods respectively.

19. The optical zoom module, as recited in claim 17, further comprising a light reflecting element, the light reflecting element is used to reflect an incident light from an incident path to an imaging path, wherein an optical center of the incident path defines an incident light axis, an optical center of the imaging path defines a main optical axis, and the incident light axis is perpendicular to the main optical axis.

20. The optical zoom module, as recited in claim 19, wherein the plurality of carriers comprises a fixed carrier and two movable carriers, wherein a fixed lens assembly is installed in the fixed carrier, and a zoom sub-lens and a compensation sub-lens are respectively installed in the two movable carriers, wherein the zoom sub-lens is arranged for adjusting a focal length of an imaging system, and the compensation sub-lens realizes focusing of the imaging system to compensate a focus shift caused by motion of the zoom sub-lens.

* * * * *